US012808803B2

(12) United States Patent
Seitter et al.

(10) Patent No.: US 12,808,803 B2
(45) Date of Patent: Nov. 24, 2026

(54) APPARATUS FOR MEASURING LIQUID SAMPLE TRANSMITTANCE

(71) Applicant: Cerillo, Inc., Charlottesville, VA (US)

(72) Inventors: Kevin Seitter, Charlottesville, VA (US); Sydney DeCleene, Charlottesville, VA (US); Derek Boylan, Charlottesville, VA (US); Julia Swavola, Boulder, CO (US); Andrew Homyk, Charlottesville, VA (US)

(73) Assignee: Cerillo, Inc., Charlottesville, VA (US)

( * ) Notice: Subject to any disclaimer, the term of this patent is extended or adjusted under 35 U.S.C. 154(b) by 176 days.

(21) Appl. No.: 19/035,761

(22) Filed: Jan. 23, 2025

(65) Prior Publication Data

US 2025/0237607 A1 Jul. 24, 2025

Related U.S. Application Data

(60) Provisional application No. 63/623,871, filed on Jan. 23, 2024.

(51) Int. Cl.
*G01N 21/64* (2006.01)

(52) U.S. Cl.
CPC . *G01N 21/6454* (2013.01); *G01N 2021/6471* (2013.01); *G01N 2201/0407* (2013.01); *G01N 2201/0636* (2013.01); *G01N 2201/0639* (2013.01)

(58) Field of Classification Search
CPC . G01N 21/6454; G01N 21/253; B01L 3/5085
See application file for complete search history.

(56) References Cited

U.S. PATENT DOCUMENTS

| | | | | |
|---|---|---|---|---|
| 5,766,957 | A | 6/1998 | Robinson et al. | |
| 7,531,140 | B2 * | 5/2009 | Szlosek | B29C 66/5346 422/566 |
| 2008/0020480 | A1 * | 1/2008 | Lin | G01N 21/253 422/82.11 |
| 2008/0287307 | A1 * | 11/2008 | Adrien | B01L 3/5085 506/7 |
| 2010/0196207 | A1 | 8/2010 | Steinmiller et al. | |
| 2012/0019828 | A1 | 1/2012 | McCaffrey et al. | |
| 2013/0202627 | A1 | 8/2013 | Gomez Casado | |

FOREIGN PATENT DOCUMENTS

| | | | | |
|---|---|---|---|---|
| WO | WO-2008034896 | A2 * | 3/2008 | B01L 3/502715 |

OTHER PUBLICATIONS

PCT/US2025/012817, International Search Report, Mar. 18, 2025.
PCT/US2025/012817, Written Opinion of the International Searching Authority, Mar. 18, 2025.

* cited by examiner

*Primary Examiner* — Abdullahi Nur
(74) *Attorney, Agent, or Firm* — VanceIP

(57) ABSTRACT

The present invention relates to a device for the measurement of transmittance of liquid samples comprising an emission apparatus, sample chamber, and detection apparatus. The emission apparatus comprises light emitters and a substrate defined by at least partially reflective boundary surfaces and exit points for light from the emitters.

20 Claims, 7 Drawing Sheets

APPARATUS FOR MEASURING LIQUID SAMPLE TRANSMITTANCE

BACKGROUND OF THE INVENTION

Various designs of devices have been proposed and realized for the measurement of liquid samples' optical properties. However, several limitations prevent the easy multiplexing of these designs to measure multiple samples simultaneously in a small footprint, especially at multiple wavelengths.

For an example, consider a multiwell plate reader. It has been demonstrated that a plate reader can be produced using individual emitter-detector pairs in alignment with each sample well contained in the plate under study (see, e.g., U.S. Pat. Nos. 9,885,652 and 11,148,141). Such devices have been on the market for several years and have experienced commercial success. However, this design has two key limitations: (1) it is inefficient to use an individual emitter for each liquid sample while rejecting most of its light, and (2) the precision of emission wavelength is limited by emission technology (e.g., an LED whose half-bandwidth is on the order of 20 nanometers), which is prohibitively difficult to correct under any reasonable financial or spatial constraints, especially if multiple wavelengths are desired in a single system.

On the opposite end of the spectrum, a plate reader has been demonstrated (see, e.g., US20210055223A1) whose emission apparatus consists of single emitters, one per wavelength, each coupled with a monochromatic filter, whose light is mixed and spatially reduced by a waveguide and further transmitted to measurement points via a bundle of optical fibers comprising "partial beam paths", each one terminating at the location of a well of a multiwell plate. While highly optically and energy efficient, this design is extremely difficult to manufacture and prone to mechanical failure, meaning that the application areas of the resulting device remain limited.

There thus remains an ongoing need for a liquid sample transmittance measurement device which is power-efficient, compact, and straightforward to manufacture, while permitting scale-up to measuring multiple samples and operation at multiple, precisely defined wavelengths.

SUMMARY OF THE INVENTION

In an aspect, there is described an apparatus, comprising an emission apparatus, sample chamber, and detection apparatus, wherein the emission apparatus, comprises: an optically transparent or translucent substrate and one or more light emitters.

In another aspect, there is described an apparatus, wherein the emission apparatus further comprises: an interior, an exterior, and a plurality of exit points and the light from the light emitters exits the substrate at an angle different from which it entered the substrate.

In another aspect, there is described an apparatus, wherein the emission apparatus further comprises: a wavelength selection apparatus located between the one or more light emitters and the substrate.

In another aspect, there is described an apparatus, wherein the emission apparatus further comprises: one or more light-collecting elements in optical alignment with each exit point.

In another aspect, there is described an apparatus, wherein the emission apparatus further comprises: a reflective treatment applied to the one or more top faces of the substrate.

In another aspect, there is described an apparatus, wherein the emission apparatus further comprises: one or more thin, optically opaque layers aligned and in contact with at least one exit-point-containing face of the substrate.

These and other aspects, which will become apparent during the following detailed description, have been achieved by the inventors' discovery of a novel apparatus for the measurement of liquid samples' transmittance containing an emission apparatus enabling efficient and versatile light direction.

BRIEF DESCRIPTION OF THE DRAWINGS

FIG. 11 shows a closeup section of an emission apparatus with a pinhole layer and an example light path.

FIG. 12 shows an emission apparatus with light restricting (e.g, pinholes) and focusing elements.

DETAILED DESCRIPTION OF THE INVENTION

Figure 1A:
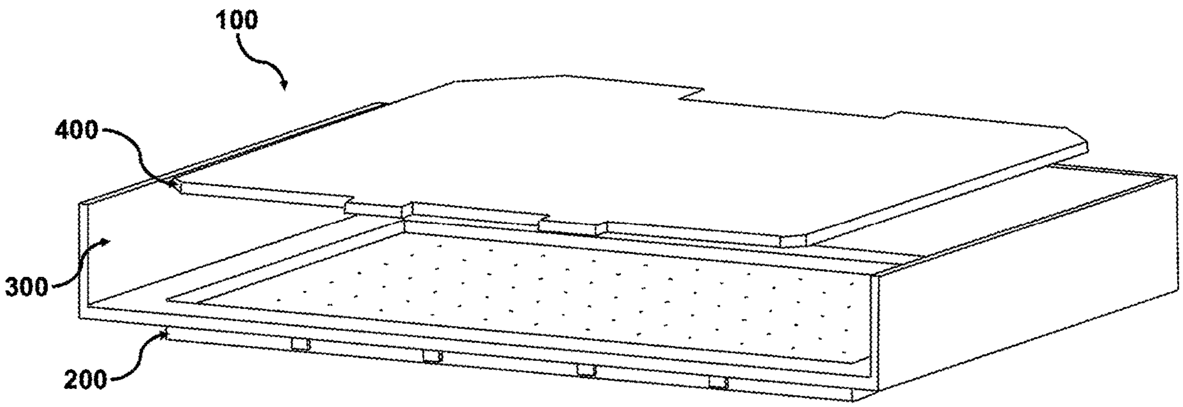
FIG. 1A shows a schematic view of an apparatus configured to accept a plate containing liquid samples.

Exemplary aspects of the present invention are described herein. Although the following detailed description contains many specifics for purposes of illustration, a person of ordinary skill in the art will appreciate that variations and alterations to the following details are within the scope of the invention. Accordingly, the following aspects of the invention are set forth without any loss of generality to, and without imposing limitations upon, the claimed invention.

In aspect herein there is described an apparatus for the measurement of one or more liquid samples' optical transmittance, comprising: an emission apparatus, a sample chamber, and a detection apparatus, wherein the emission apparatus comprises: (i) optically transparent or translucent substrate defined by boundary surfaces that are at least partially reflective and having exit points; and, (ii) one or more light emitters aligned to project light into the substrate, wherein the light exits the substrate at an angle different from which it entered.

In some aspects, the apparatus is configured so that the substrate, comprises: a plurality of exit points that have at least one area of increased transmissibility and decreased reflectivity.

In some aspects, the apparatus is configured for the measurement of liquid samples' transmittance using the described emission apparatus, thereby enabling efficient and versatile light direction.

In some aspects, there is described an emission apparatus configured for light redirection, steering, and focusing in a single component (e.g., the substrate).

In another aspect, there is described an emission apparatus that is configured for inclusion in a variety of compact-geometry settings, enabling measurement using fewer components, more wavelengths, lower power, or a combination of the these and other traits, when compared with the state of the art in miniaturized multiplexed liquid sampling.

Names for components shown in FIGS. 1-12 are as follows:

| | |
|---|---|
| 100 | measurement apparatus |
| 102 | measurement light beam |
| 200 | emission apparatus |
| 202 | emission apparatus substrate |
| 204 | emission apparatus internally reflective surface |
| 206 | light emitter(s) |
| 208 | emission apparatus exit face |
| 210 | emission apparatus exit point(s) |
| 212 | wavelength selection apparatus |
| 214 | emission apparatus light-collecting element(s) |
| 216 | optically opaque layer |
| 218 | optically opaque layer pinhole(s) |
| 220 | light emitter focusing element |
| 300 | sample chamber |
| 302 | liquid sample |
| 304 | liquid sample intermediary container |
| 400 | detection apparatus |
| 402 | light detector(s) |

In aspect herein there is described an apparatus (100) for the measurement of liquid sample transmittance, comprising: an emission apparatus (200), a sample chamber (300), and a detection apparatus (400).

The sample chamber (300) can be configured to accept either a liquid sample (302) or a sample vessel (304) containing a liquid sample (302) and places the sample in optical alignment with a path of measurement light (102) originating in the emission apparatus (200) and quantified in the detection apparatus (400).

The detection apparatus (400) comprises one or more detectors (402) configured to receive measurement light (102) transmitted through at least one liquid sample (302).

The emission apparatus (200) comprises an optically transparent or translucent substrate (202) bounded by reflective surfaces (204) configured to contain light shined into them by light emitters (206). The substrate may be solid or defined only by its boundary surfaces. One or more boundary surfaces, non-perpendicular to the light emitted by the light emitters (206), are designated as an exit face(s) (208), containing a plurality of exit points (210). The reflective properties of these points are different from the normal reflective properties of the substrate's boundary.

FIG. 1A shows a schematic view of measurement apparatus (100) configured to accept a multiwell plate into its sample chamber (300). The emission apparatus (200) is configured to transmit light from beneath the sample in an upward direction to the detection apparatus (400).

Figure 1B:
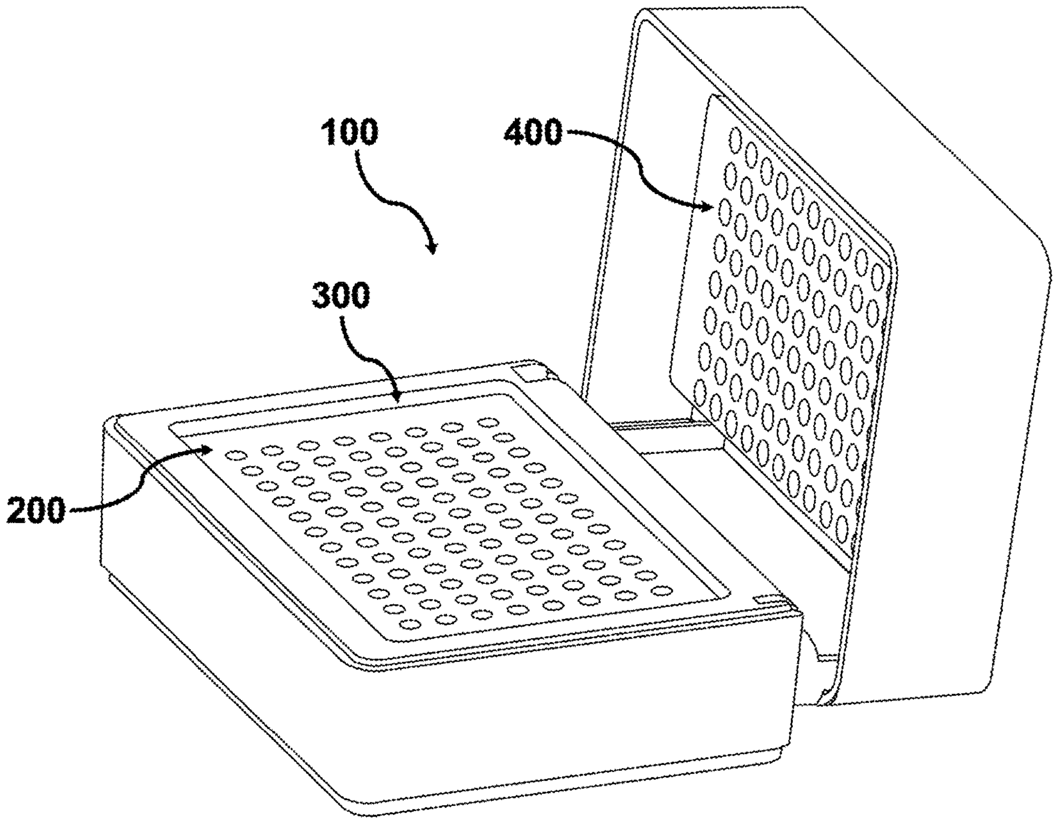
FIG. 1B shows another schematic view of an apparatus configured to accept a plate containing liquid samples.

FIG. 1B shows another schematic view of measurement apparatus (100). In this example, emission apparatus (200) and detection apparatus (400) are housed within a clamshell case configured to allow movement relative to one another when not actively measuring; the open configuration is shown.

Figure 2A:
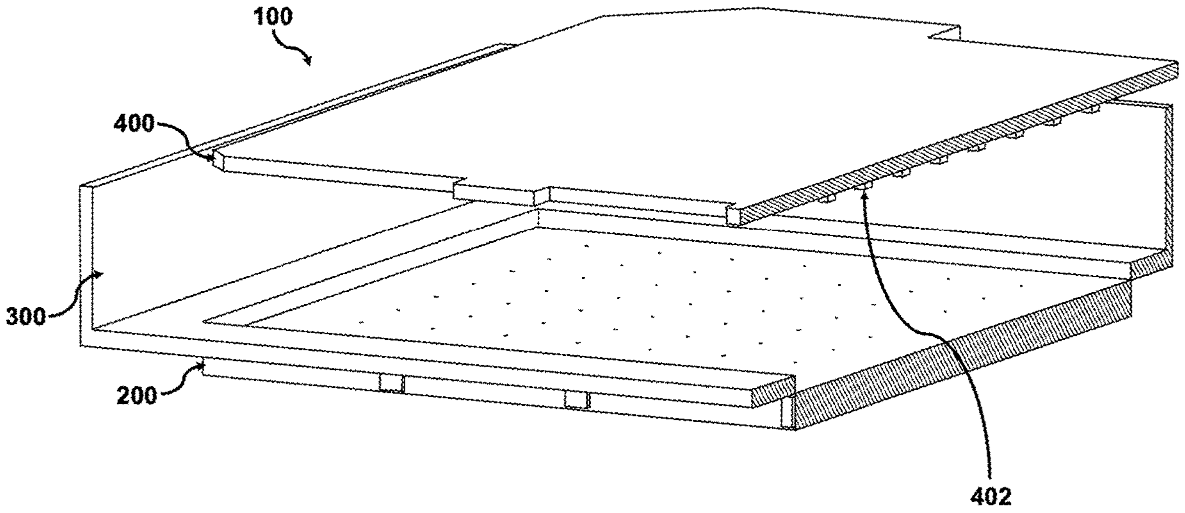
FIG. 2A shows a schematic section view of an apparatus with individual detection elements.

FIG. 2A shows a section view of the measurement apparatus (100), emission apparatus (200), sample chamber (300), and detection apparatus (400), configured as in FIG. 1, cut away to reveal the light detectors (402).

Figure 2B:
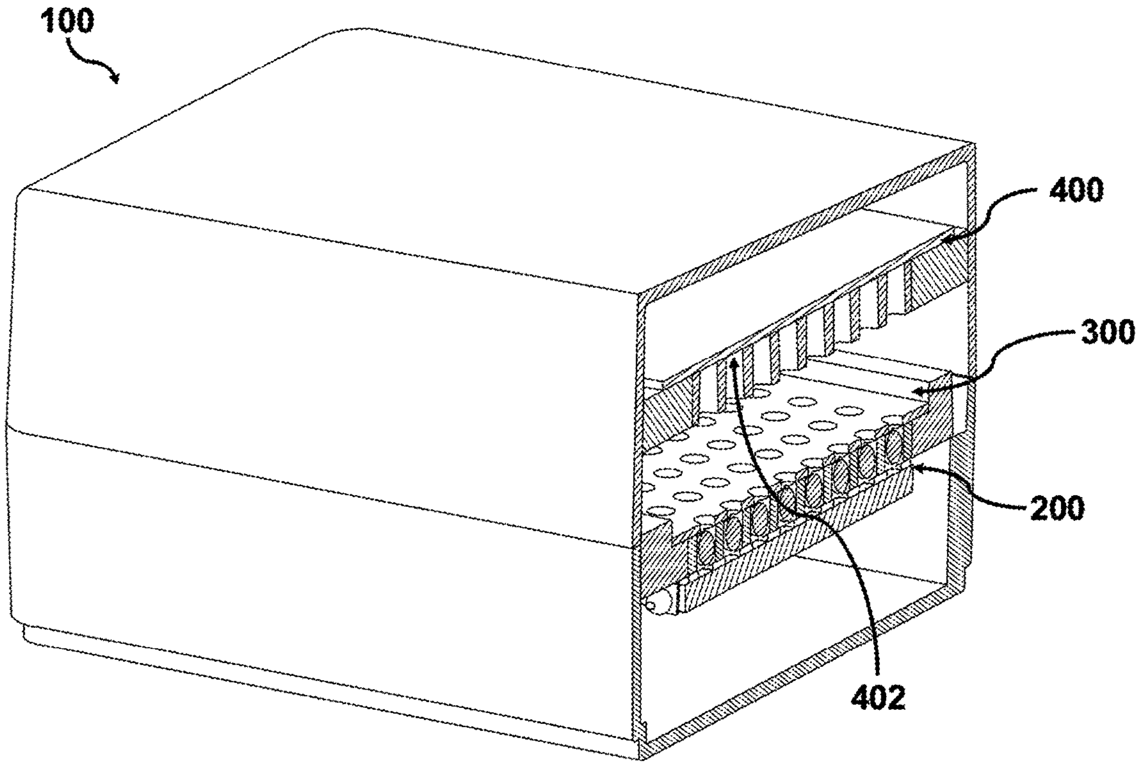
FIG. 2B shows another section view of an apparatus with detection elements.

FIG. 2B shows another section view of measurement apparatus (100). In this example, the functional components are contained within an exterior case.

Figure 3A:
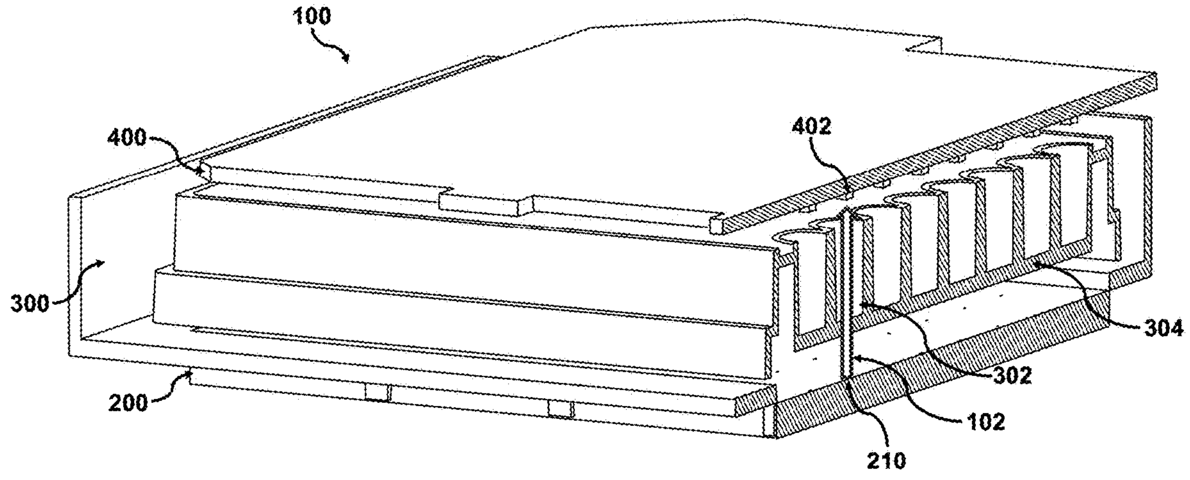
FIG. 3A shows a schematic section view of an apparatus configured with a sample plate and a single illustrative light path through the liquid sample chamber.

FIG. 3A shows the same section view in FIG. 2A, with the inclusion of a liquid sample (302) inside a multiwell plate functioning as a sample container (304) positioned inside the sample chamber (300). An example beam of measurement light (102) illustrates the optical alignment between the emission apparatus (200)'s exit points (210), the liquid samples (302), and the detectors (402).

Figure 3B:
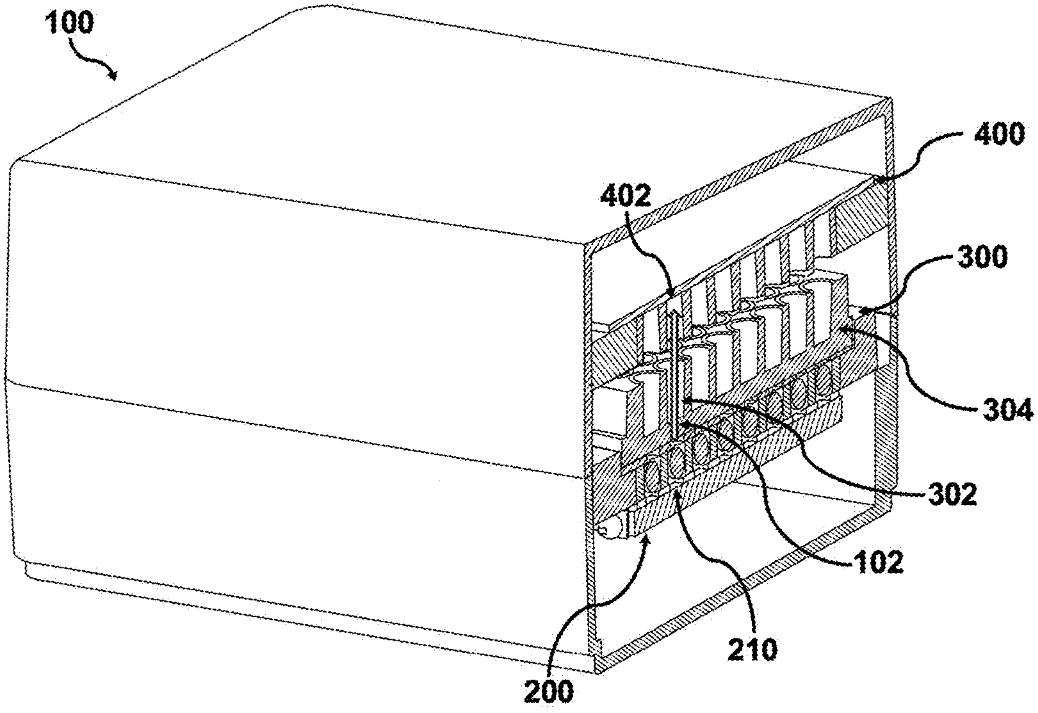
FIG. 3B shows another schematic section view of an apparatus with a sample plate and light path.

FIG. 3B shows another section view of measurement apparatus. In this example, the functional components are contained within an exterior case.

Figure 4:
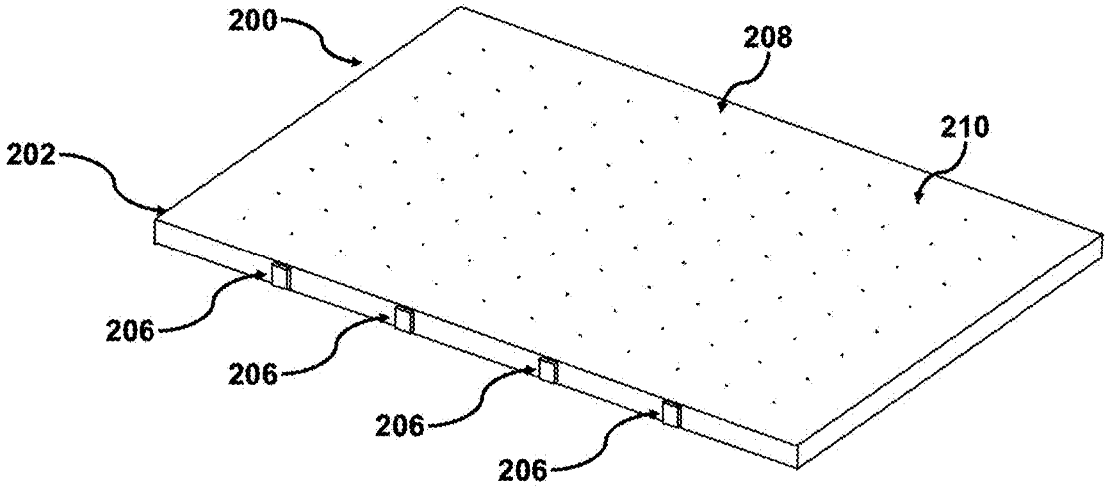
FIG. 4 shows a schematic view of an emission apparatus.

FIG. 4 shows a schematic view of the emission apparatus (200), comprising an optically transmissive substrate (202) with a single designated exit face (208) containing a plurality of exit points (210). On a face non-parallel to the exit face (208) are bonded four light emitters (206) such that their emitted light is non-perpendicular to the designated exit face.

Figure 5:
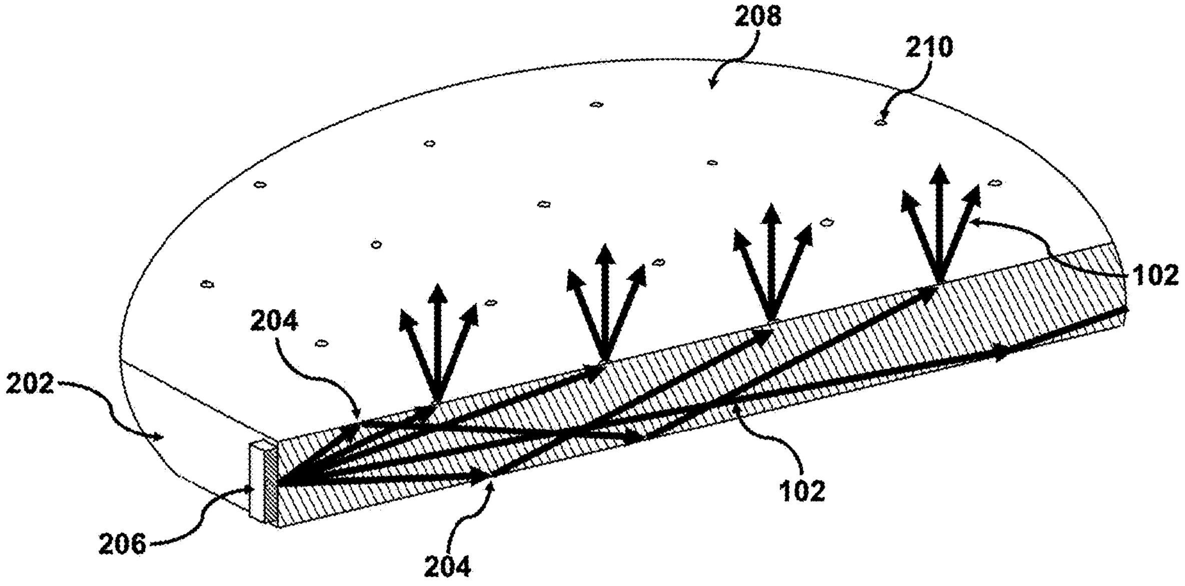
FIG. 5 shows a section view of an emission apparatus with example light paths.

FIG. 5 shows a section view of the emission apparatus, illustrating the path of measurement light (102) through the substrate (202), from the example light emitter (206) to the exit points (210) on the exit face (208). Numerous reflections are shown on the substrate (202)'s internally reflective faces (204).

In another aspect, a wavelength-selection apparatus (212) is incorporated between the light emitters (206) and the substrate (202) to intercept the measurement light (102) and narrow its emission spectrum.

Figure 6:
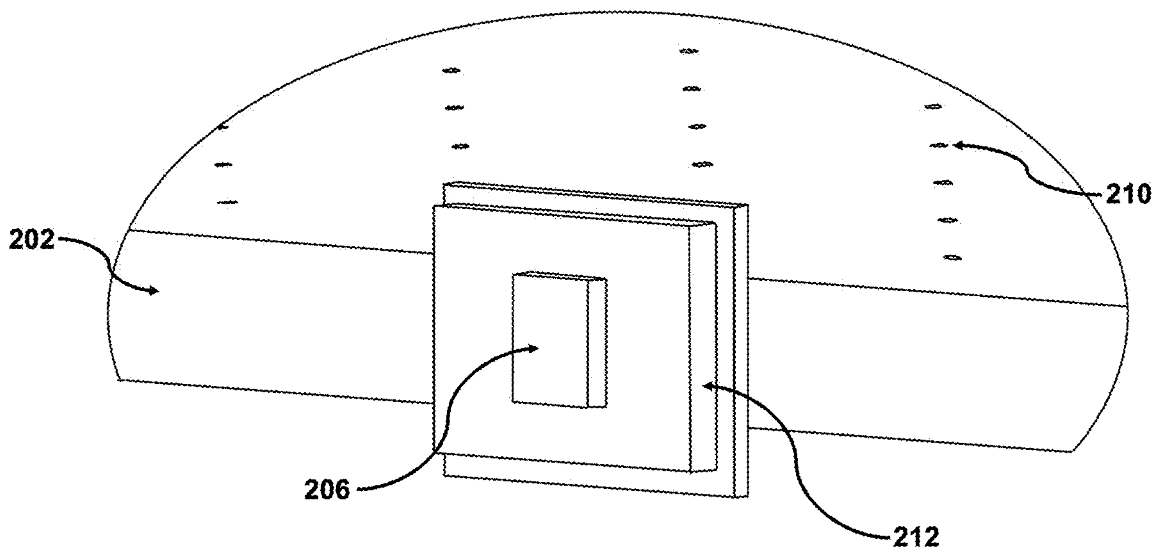
FIG. 6 shows a closeup view of an emission apparatus, highlighting an individual emitter and optional wavelength selection apparatus.

FIG. 6 shows a close-up view of a single light emitter (206) that is separated from the substrate (202) by a simple wavelength selection apparatus (212), which, in this example schematically comprises: two flat optically active layers, such that the light from the light emitter (206) is intercepted and wavelength selection is performed before the measurement light reaches any exit point (210).

In another aspect, a focusing element (220) is placed after the light emitter (206), which may then be followed by an optional wavelength selection apparatus (212).

In another aspect, the geometry of the substrate (202) is configured such that measurement light entering it is spread preferentially or evenly to the exit points (210).

Figure 7:
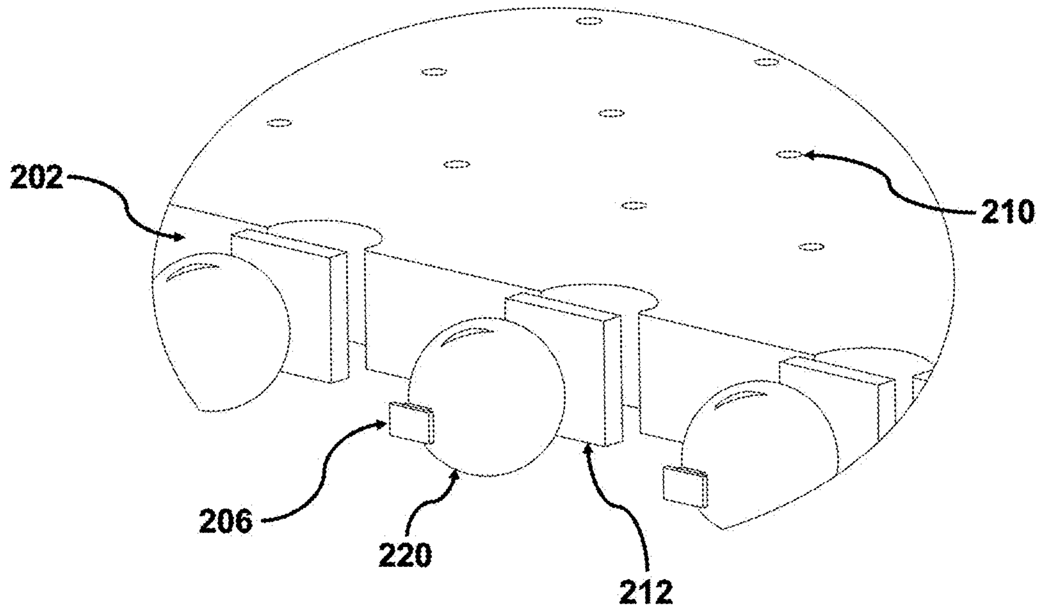
FIG. 7 shows a closeup view of an emission apparatus as reduced to practice.

FIG. 7 shows a close-up view of a light emitter (206) followed by a focusing element (220), which, in this example, comprises a spherical lens, but which may also comprise a planoconvex lens, a biconvex lens, an aspheric lens, or any other light-directing element. Further shown is a wavelength selection apparatus (212), which, in this example, comprises a flat optically active layer, such that the light from the light emitter (206) passing through the focusing element (220) is intercepted and wavelength selection is performed before the measurement light reaches the substrate (202). FIG. 7 further shows an optically active geometry incorporated into the substrate such that light is directed evenly to the exit points (210); in this example, such geometry comprises a diverging lens formed into the substrate (202), but may also comprise a converging lens, a diffraction grating, an array of lenses, or any other shape which refracts the measurement light to spread it among the substrate.

Figure 8:
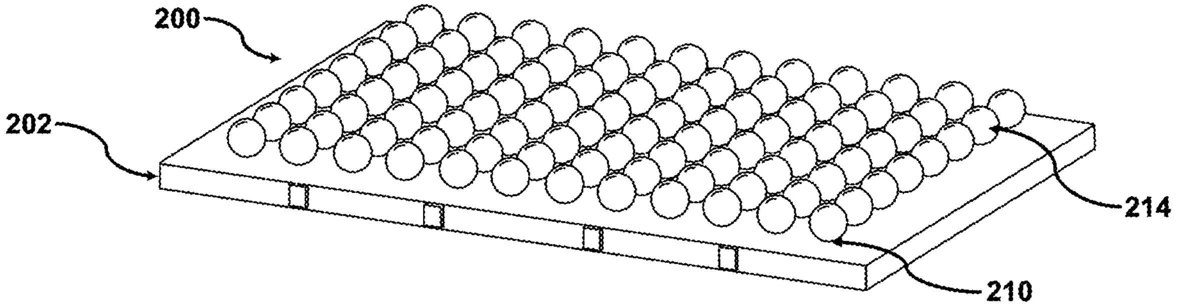
FIG. 8 shows an emission apparatus with light collecting elements in alignment with exit points.

FIG. 8 shows the emission apparatus (200) configured such that there are light-collecting elements (214) in optical alignment with each exit point (210) in the substrate (202). In another aspect, one or more light-collecting elements (214) are incorporated in optical alignment with the exit points (210) such that they collect and spatially narrow the measurement light (102) exiting the substrate (202) via refraction.

Figure 9:
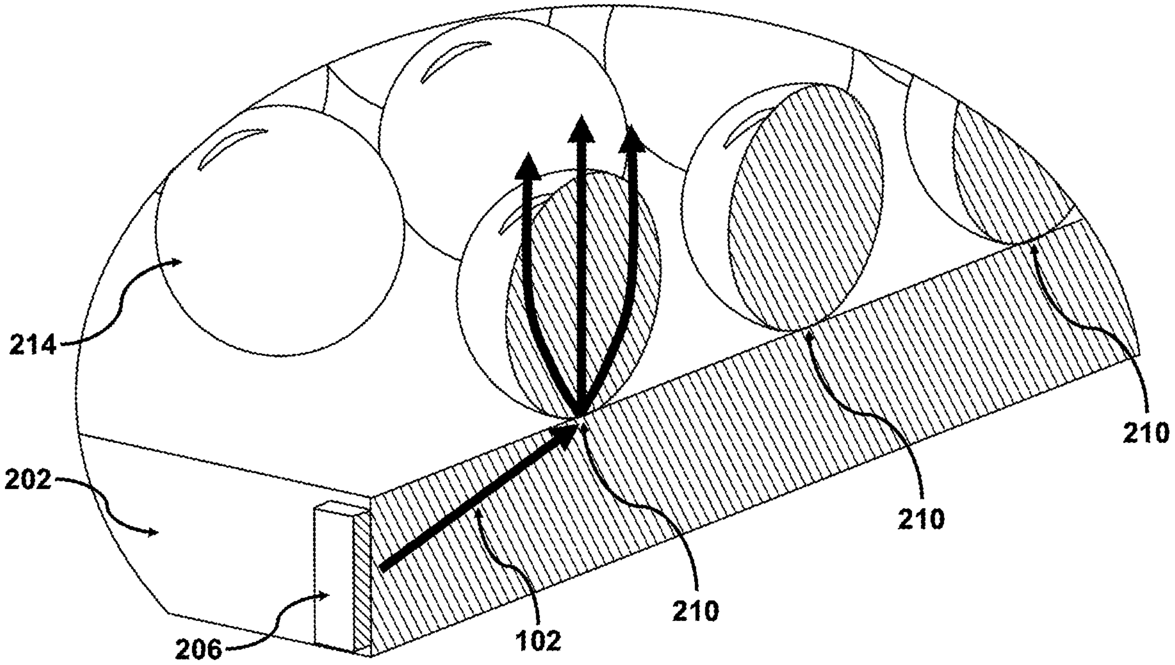
FIG. 9 shows a closeup section view of an emission apparatus with an example light path into and through a light collecting element.

FIG. 9 shows an example path of measurement light (102) emitted through the substrate (202) from the emitter (206) to an example exit point (210), at which point the wide emissions are collected by the light collecting element (214) to produce a narrowed beam.

In another aspect, the substrate (202) is a solid, transparent or translucent material, and at least one face is treated with a reflective coating (or layer) to maximize interior light containment.

In another aspect, an optically opaque layer (216), comprises a thin optically opaque material with small-diameter holes (pinholes) and configured in optical alignment with one or more exit faces (208) of the substrate (202) such that each exit point (210) is in optical alignment with exactly one pinhole (218).

Figure 10:
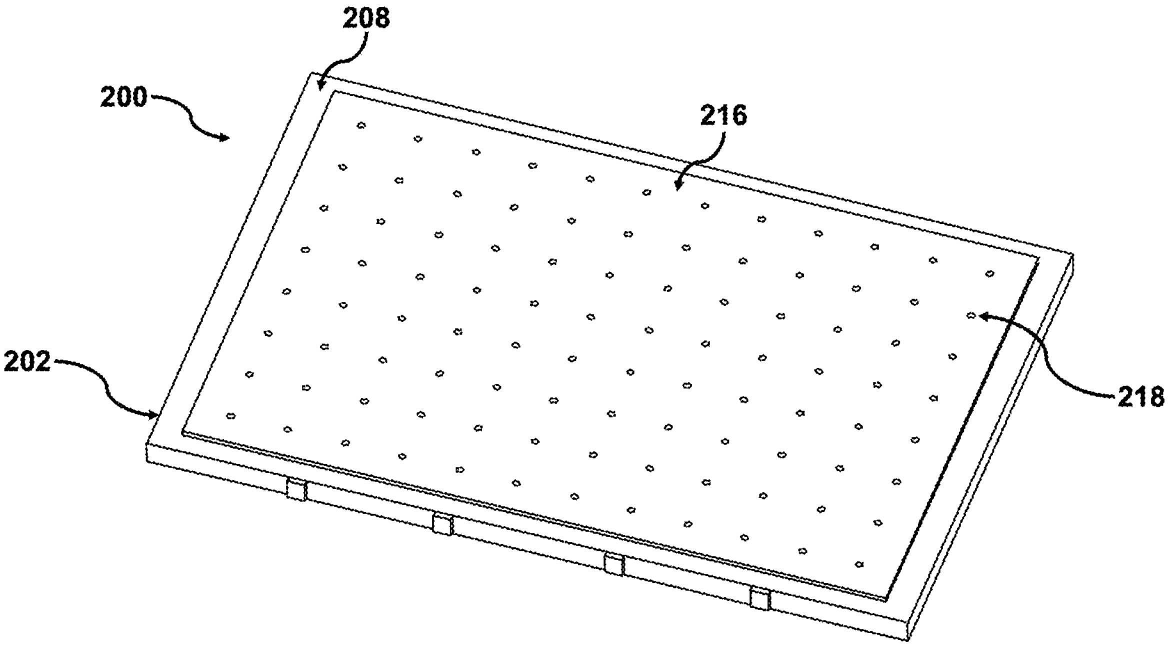
FIG. 10 shows an emission apparatus with a pinhole layer.

FIG. 10 shows the emission apparatus (200) configured with an optically opaque layer (216) parallel to the substrate (202)'s exit face (208) such that each exit point (210) is in alignment with one pinhole (218) in the opaque layer.

FIG. 11 shows an example path of measurement light (102) emitted through the substrate (202) from the emitter (206) to an example exit point (210), at which point the wide emissions are attenuated by the optically opaque layer (216) to allow passage of only a narrow subsection of measurement light.

In another aspect, the exit points (210) on the exit face (208) are defined solely by the presence of a pinholes (218) in an optically opaque layer (216), rather than by any feature inherent to the substrate (202).

In another aspect, there is described an apparatus for the measurement of one or more liquid samples' optical transmittance, comprising:

a) an emission apparatus, comprising:
  i) an optically transparent or translucent substrate defined by boundary surfaces that are at least partially reflective, the substrate, comprising:
    1) an interior; and,
    2) an exterior, comprising:
      A) one or more top faces;
      B) one or more bottom faces; and,
      C) one or more edge faces;
    3) a plurality of exit points located on the one or more top faces of the exterior, each exit point: comprising: an area of increased transmissibility and decreased reflectivity; and,
  ii) one or more light emitters aligned to project light into the substrate, wherein the projected light exits the substrate:
    1) through the plurality of exit points; and,
    2) at an angle different from which it entered the substrate;
b) a sample chamber configured to hold one or more liquid samples wherein each liquid sample, when present, is held in optical alignment with at least one of the exit points in the emission apparatus;
c) a detection apparatus, comprising: one or more light detectors, wherein at least one light detector is in optical alignment with light emitted from each exit point in the emission apparatus;

wherein the apparatus is configured such that, upon activation:
  (A) the light emitters cause light to traverse the interior of the substrate;
  (B) the traversing light is at least partially confined via internal reflection from the substrate's boundary surfaces
  (C) at least a portion of the traversing light escapes at the exit points;
  (D) the escaped light further traverses the sample chamber, including, if present, the one or more liquid samples; and,
  (E) the light then reaches the detection apparatus.

In another aspect, the interior of the substrate, further comprises: one or more reflective faces.

In another aspect, the one or more light emitters aligned to project light into the substrate through a face or faces selected from:
  a) the one or more of edge faces;
  b) the one or more bottom faces; and,
  c) a combination thereof.

In another aspect, the i) optically transparent or translucent substrate further comprises:
  4) one or more geometric features that function as refractive elements to spread the measurement light among the exit points.

In another aspect, emission apparatus further comprises:
  iii) a wavelength selection apparatus located between the one or more light emitters and the substrate.

In another aspect, the wavelength selection apparatus is selected from:
  a) a monochromatic bandpass filter;
  b) a longpass filter;
  c) a shortpass filter;
  d) a diffraction grating, comprising: a slit or pinhole; and,
  e) a prism, comprising: a slit or pinhole.

In another aspect, the wavelength selection apparatus is e) a diffraction grating, comprising: a slit or pinhole, wherein the slit or pinhole is configured to be moveable such that the wavelength selection apparatus is a monochromator.

In another aspect, the emission apparatus further comprises:
  iv) a first one or more light-focusing (or collecting) elements, each located between each of the one or more light emitters and the substrate.

In another aspect, the first light-focusing elements are selected from:
  a) planoconvex lenses;
  b) biconvex lenses;
  c) aspheric lenses; and,
  d) ball lenses.

In another aspect, the emission apparatus further comprises:
  v) a second one or more light-focusing (or collecting) elements, each in optical alignment with each exit point.

In another aspect, the second light-focusing elements are selected from:
  e) planoconvex lenses;
  f) biconvex lenses;
  g) aspheric lenses; and,
  h) ball lenses.

In another aspect, the emission apparatus further comprises:

vi) a reflective treatment applied to the one or more top faces of the substrate.

In another aspect, the reflective treatment is selected from:

a) white paint;

b) sputtered aluminum;

c) metal plating; and, d) an optical bond with a second material of high flatness and reflectivity.

In another aspect, the emission apparatus further comprises:

vii) one or more thin, optically opaque layers aligned and in contact with at least one exit-point-containing face of the substrate and containing pinholes each in alignment with exactly one exit point.

In another aspect, the one or more thin, optically opaque layers are reflective on the face in contact with the substrate.

In another aspect, the emission apparatus further comprises:

viia) a first thin, optically opaque layer aligned and in contact with at least one exit-point-containing face of the substrate and containing pinholes each in alignment with exactly one exit point.

In another aspect, the first thin, optically opaque layer(s) is reflective on the face in contact with the substrate.

In another aspect, the emission apparatus further comprises:

viib) a second thin, optically opaque layers containing pinholes each in optical alignment with exactly one light focusing element.

In another aspect, the second thin, optically opaque layer is reflective on the face in contact with the one or more light focusing elements.

In another aspect, the emission apparatus further comprises:

v) a second one or more light-focusing elements, each in optical alignment with each exit point; and, viia) a first thin, optically opaque layer aligned and in contact with at least one exit-point-containing face of the substrate and containing pinholes each in alignment with exactly one exit point.

In another aspect, the emission apparatus further comprises:

v) a second one or more light-focusing elements, each in optical alignment with each exit point;

viia) a first thin, optically opaque layer aligned and in contact with at least one exit-point-containing face of the substrate and containing pinholes each in alignment with exactly one exit point; and, viib) a second thin, optically opaque layers containing pinholes each in optical alignment with exactly one light focusing element.

In another aspect, the a) emission apparatus further comprises: one or more elements selected from:

iii) a wavelength selection apparatus located between the one or more light emitters and the substrate;

iv) a first one or more light-focusing elements, each located between each of the one or more light emitters and the substrate;

v) a second one or more light-focusing elements, each in optical alignment with each exit point;

vi) a reflective treatment applied to the one or more top faces of the substrate;

viia) a first one or more thin, optically opaque layer aligned and in contact with at least one exit-point-containing face of the substrate and containing pinholes each in alignment with exactly one exit point; and, viib) a second thin, optically opaque layers containing pinholes each in optical alignment with exactly one light focusing element.

In another aspect, the a) emission apparatus further comprises: at least two of elements iii)-viib).

In another aspect, the a) emission apparatus further comprises: at least three of elements iii)-viib).

In another aspect, the a) emission apparatus further comprises: at least four of elements iii)-viib).

In another aspect, the a) emission apparatus further comprises: at least five of elements iii)-viib).

In another aspect, the a) emission apparatus further comprises: all six of elements iii)-viib).

FIG. 12 shows an example collection of components which together form and direct measurement light beam (102). In this example, the collection comprises: substrate (200); first thin optically opaque layer (216) containing a plurality of pinholes (218), each in alignment with a substrate exit point (210); a plurality of light-focusing elements (214) positioned such that each is in alignment with a pinhole (218) in the first thin optically opaque layer; and a second thin optically opaque layer (216) containing a plurality of pinhole (218), each in alignment with the measurement light beam (102) exiting a light-focusing element (214).

Light emitters are structures that emit light. Examples of light emitters include (a) LED (light-emitting diode), (b) LED and a focusing lens, and (c) laser diode.

The one or more light emitters are aligned to project light into the substrate such that the light exits the substrate through the plurality of exit points and at an angle different from which it enters the substrate. In another aspect, the one or more light emitters are aligned to project light into the substrate through the one or more edge faces and/or one or more bottom faces. Examples include, projecting light into the substrate: (a) through the one or more edge faces, (b) through the one or more bottom faces, and (c) through a combination of both.

In another aspect, the entry and interior light path is non-perpendicular with at least one top face.

In another aspect, the exit light path (light exiting an exit point) is perpendicular to the top face containing the exit point.

Examples of the boundary surfaces of the optically transparent or translucent substrate include the substrate itself (e.g., the edges of the substrate are at least partially internally reflective) and external boundaries that are at least partially reflective (e.g., mirrored borders surrounding the substrate). The borders can be in direct contact with the substrate or directly adjacent to the substrate.

In another aspect, the traversing light is completely confined via internal reflection from the substrate's boundary surfaces. Examples of completely include 90, 91, 92, 93, 94, 95, 96, 97, 98, 99, to 100%. Examples also include 90-100% and 95-100%.

In another aspect, the sample chamber is located above or on top of the emission apparatus.

In another aspect, the sample chamber is configured to hold one or more liquid samples directly or via an intermediary container.

In another aspect, the detection apparatus is located above or on top of the sample chamber.

In another aspect, the light detectors are selected from: photodiodes, phototransistors, photoresistors, and/or photomultipliers, or integrated circuits containing the same.

In another aspect, the apparatus is configured such that, upon activation, (C) the light escapes primarily at the exit points. Examples of primarily include at least 60, 65, 70, 75, 80, 85, to 90%. Examples also include 60-90%, 70-90%, and 80-90%.

In another aspect, the apparatus is configured such that, upon activation, (C) the light escapes completely at the exit points. Examples of completely include 90, 91, 92, 93, 94, 95, 96, 97, 98, 99, to 100%. Examples also include 90-100% and 95-100%.

In another aspect, the light-focusing (or collecting) elements are designed to collect emitted light and maximize transmission of light through aligned liquid samples In another aspect, the reflective treatment is configured to minimize undesired escape of light emissions through surfaces designated as reflective.

With respect to the reflective treatment, an optical bond means any method of affixing or joining two surfaces such that a majority of the surface area of the joint comprises a single optical interface.

Examples of a second material of high flatness and reflectivity include a first-surface mirror or foil tape.

In another aspect, the one or more thin, optically opaque layers are aligned with the light-focusing elements, such that each pinhole is in alignment with the light having transmitted through the corresponding light-focusing element.

Thin means less than two millimeters in thickness.

In another aspect, the apparatus is a solid-state apparatus.

In another aspect, the emission apparatus and detection apparatus are housed within an exterior case configured to allow movement relative to one another when not actively measuring. In another aspect, the exterior case is a clamshell case, comprising: an upper housing and a lower housing that are fixed at least one point (e.g., fixed by a hinge element).

It will be apparent to one skilled in the art that these aspects, combinations thereof, and other aspects are included in the scope of the below-claimed invention.

All references listed herein are individually incorporated herein in their entirety by reference. Numerous modifications and variations of the present invention are possible considering the above teachings. It is therefore to be understood that within the scope of the appended claims, the invention may be practiced otherwise than as specifically described herein.

The invention claimed is:

1. An apparatus for the measurement of one or more liquid samples' optical transmittance, comprising:

a) an emission apparatus, comprising:

i) an optically transparent or translucent substrate defined by boundary surfaces that are at least partially reflective, the substrate, comprising:

1) an interior; and, 2) an exterior, comprising:

A) one or more top surfaces;

B) one or more bottom surfaces; and,

C) one or more edge surfaces;

3) a plurality of exit points located on the one or more top faces of the exterior, each exit point: comprising: an area of increased transmissibility and decreased reflectivity; and, ii) one or more light emitters aligned to project light into the substrate, wherein the projected light exits the substrate:

1) through the plurality of exit points; and, 2) at an angle different from which it entered the substrate;

b) a sample chamber configured to hold one or more liquid samples wherein each liquid sample, when present, is held in optical alignment with at least one of the exit points in the emission apparatus;

c) a detection apparatus, comprising: one or more light detectors, wherein at least one light detector is in optical alignment with light emitted from each exit point in the emission apparatus;

wherein the apparatus is configured such that, upon activation:

(A) the light emitters cause light to traverse the interior of the substrate;

(B) the traversing light is at least partially confined via internal reflection from the substrate's boundary surfaces (C) at least a portion of the traversing light escapes at the exit points;

(D) the escaped light further traverses the sample chamber, including, if present, the one or more liquid samples; and, (E) the light then reaches the detection apparatus.

2. The apparatus of claim 1, wherein the interior of the substrate, further comprises: one or more reflective faces.

3. The apparatus of claim 1, wherein the one or more light emitters aligned to project light into the substrate through a face or faces selected from:

a) the one or more of edge faces;

b) the one or more bottom faces; and, c) a combination thereof.

4. The apparatus of one of claim 1, wherein the i) optically transparent or translucent substrate further comprises:

4) one or more geometric features that function as refractive elements to spread the measurement light among the exit points.

5. The apparatus of one of claim 1, wherein the a) emission apparatus further comprises:

iii) a wavelength selection apparatus located between the one or more light emitters and the substrate.

6. The apparatus of claim 5, wherein the wavelength selection apparatus is selected from:

a) a monochromatic bandpass filter;

b) a longpass filter;

c) a shortpass filter;

d) a diffraction grating, comprising: a slit or pinhole; and, e) a prism, comprising: a slit or pinhole.

7. The apparatus of claim 6, wherein the wavelength selection apparatus is e) a diffraction grating, comprising: a slit or pinhole, wherein the slit or pinhole is configured to be moveable such that the wavelength selection apparatus is a monochromator.

8. The apparatus of claim 1, wherein the emission apparatus further comprises:

iv) a first one or more light-focusing elements, each located between each of the one or more light emitters and the substrate.

9. The apparatus of claim 8, wherein the first one or more light-focusing elements are independently selected from:

a) planoconvex lenses;

b) biconvex lenses;

c) aspheric lenses; and, d) ball lenses.

10. The apparatus of claim 1, wherein the emission apparatus further comprises:

v) a second one or more light-focusing elements, each in optical alignment with each exit point.

11. The apparatus of claim 10, wherein the second one or more light-focusing elements are independently selected from:

a) planoconvex lenses;
b) biconvex lenses;
c) aspheric lenses; and,
d) ball lenses.

12. The apparatus of claim 1, wherein the emission apparatus further comprises:

vi) a reflective treatment applied to the one or more top faces of the substrate.

13. The apparatus of claim 12, wherein the reflective treatment is selected from:

a) white paint;
b) sputtered aluminum;
c) metal plating; and,
d) an optical bond with a second material of high flatness and reflectivity.

14. The apparatus of claim 1, wherein the emission apparatus further comprises:

viia) a first one or more thin, optically opaque layer aligned and in contact with at least one exit-point-containing face of the substrate and containing pinholes each in alignment with exactly one exit point.

15. The apparatus of claim 14, wherein the first thin, optically opaque layer is reflective on the face in contact with the substrate.

16. The apparatus of claim 1, wherein the emission apparatus further comprises:

viib) a second thin, optically opaque layers containing pinholes each in optical alignment with exactly one light focusing element.

17. The apparatus of claim 16, wherein the second thin, optically opaque layer is reflective on the face in contact with the one or more light focusing elements.

18. The apparatus of claim 1, wherein the emission apparatus further comprises:

v) a second one or more light-focusing elements, each in optical alignment with each exit point; and, viia) a first thin, optically opaque layer aligned and in contact with at least one exit-point-containing face of the substrate and containing pinholes each in alignment with exactly one exit point.

19. The apparatus of claim 1, wherein the emission apparatus further comprises:

v) a second one or more light-focusing elements, each in optical alignment with each exit point;

viia) a first thin, optically opaque layers aligned and in contact with at least one exit-point-containing face of the substrate and containing pinholes each in alignment with exactly one exit point; and, viib) a second thin, optically opaque layers containing pinholes each in optical alignment with exactly one light focusing element.

20. The apparatus of one of claim 1, wherein the a) emission apparatus further comprises: one or more elements selected from:

iii) a wavelength selection apparatus located between the one or more light emitters and the substrate;

iv) a first one or more light-focusing elements, each located between each of the one or more light emitters and the substrate;

v) a second one or more light-focusing elements, each in optical alignment with each exit point;

vi) a reflective treatment applied to the one or more top faces of the substrate;

viia) a first one or more thin, optically opaque layer aligned and in contact with at least one exit-point-containing face of the substrate and containing pinholes each in alignment with exactly one exit point; and, viib) a second thin, optically opaque layers containing pinholes each in optical alignment with exactly one light focusing element.

* * * * *